(12) United States Patent
Gritsch

(10) Patent No.: US 11,095,123 B2
(45) Date of Patent: Aug. 17, 2021

(54) REDUNDANT DC VOLTAGE NETWORK

(71) Applicant: Siemens Aktiengesellschaft, Munich (DE)

(72) Inventor: Christian Gritsch, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 46 days.

(21) Appl. No.: 16/615,048

(22) PCT Filed: May 23, 2018

(86) PCT No.: PCT/EP2018/063433
§ 371 (c)(1),
(2) Date: Nov. 19, 2019

(87) PCT Pub. No.: WO2018/215501
PCT Pub. Date: Nov. 29, 2018

(65) Prior Publication Data
US 2021/0167597 A1    Jun. 3, 2021

(30) Foreign Application Priority Data
May 24, 2017 (EP) ..................... 17172717

(51) Int. Cl.
*H02J 1/12* (2006.01)
*H02J 7/34* (2006.01)
*H02J 1/10* (2006.01)

(52) U.S. Cl.
CPC ................... *H02J 1/12* (2013.01);
*H02J 1/10* (2013.01); *H02J 1/102* (2013.01);
*H02J 7/34* (2013.01);
(Continued)

(58) Field of Classification Search
CPC ...... H02J 1/10; H02J 1/102; H02J 1/12; H02J 1/106; H02J 7/34; H02J 2310/40;
(Continued)

(56) References Cited

U.S. PATENT DOCUMENTS 7,923,857 B2 * 4/2011 Langlois .................. H02J 1/08
307/9.1
2013/0009591 A1   1/2013 Demetriades et al.
2014/0361621 A1  12/2014 Lindtjorn

FOREIGN PATENT DOCUMENTS

CA        2638224 A1    2/2009
DE   102006010713 A1    9/2007
(Continued)

OTHER PUBLICATIONS

"PCT International Search Report and Written Opinion of International Searching Authority dated Sep. 21, 2018 corresponding to PCT International Application No. PCT/EP2018/063433 filed May 23, 2018".

*Primary Examiner* — Ryan Johnson
(74) *Attorney, Agent, or Firm* — Henry M. Feiereisen LLC

(57) ABSTRACT

A DC voltage network includes a first DC voltage subnetwork, a second DC voltage subnetwork, and an energy storage network. Interconnecting the first DC voltage subnetwork and the energy storage network is a first power converter; and interconnecting the second DC voltage subnetwork and the energy storage network; is a second power converter. An energy storage device is connected to the energy storage network in such a way that the energy storage network has a voltage of the energy storage device and a feed apparatus connects at least one of the first DC voltage subnetwork and the second DC voltage subnetwork to an AC
(Continued)

voltage network. A connection converter interconnects the first DC voltage subnetwork and the second DC voltage subnetwork.

9 Claims, 6 Drawing Sheets

(52) U.S. Cl.
CPC ....... *H02J 2310/42* (2020.01); *H02J 2310/44* (2020.01); *H02J 2310/48* (2020.01)

(58) Field of Classification Search
CPC ............... H02J 2310/42; H02J 2310/44; H02J 2310/48; B64D 2221/00; Y02T 10/70; B63H 21/17; B63H 23/24; B60L 2200/10; B60L 2210/10; B60L 5/00; B60L 9/00; B60L 13/00
See application file for complete search history.

(56) References Cited

FOREIGN PATENT DOCUMENTS

| DE | 102008010979 A1 | 8/2009 |
| DE | 102014208201 A1 | 11/2015 |
| DE | 102015222544 A1 | 5/2017 |
| KR | 101277185 B1 | 6/2013 |
| KR | 20140123982 A | 10/2014 |
| RU | 2467891 C2 | 11/2012 |
| RU | 2520918 C2 | 6/2014 |

\* cited by examiner

REDUNDANT DC VOLTAGE NETWORK

CROSS-REFERENCES TO RELATED APPLICATIONS

This application is the U.S. National Stage of International Application No. PCT/EP2018/063433, filed May 23, 2018, which designated the United States and has been published as International Publication No. WO 2018/215501 and which claims the priority of European Patent Application, Serial No. 17172717.5, filed May 24, 2017, pursuant to 35 U.S.C. 119(a)-(d).

BACKGROUND OF THE INVENTION

The invention relates to a DC voltage network with a first DC voltage subnetwork, a second DC voltage subnetwork and an energy storage device. The invention further relates to a method for controlling a DC voltage network of this kind.

Nowadays, frequency converters are being extended to use in an ever wider range of contexts, and in addition to the classic function of merely regulating a motor, they also have the option of being the network supply (e.g. in wind turbines) or even form an entire DC voltage network, also referred to as a DC system. A DC voltage network should now be considered here in which electrical apparatuses such as consumers and sources exchange electrical energy. The suppling of the DC voltage network with electrical energy takes place with the aid of one or more current converters from an AC voltage network.

A typical exemplary application of a DC voltage network is the suppling of energy within a ship or a vehicle, in particular a rail vehicle. With the aid of the DC voltage system, electrical energy is distributed to individual consumers. In this context, some of the available drives and equipment should still function even in the event of a fault. This is referred to as redundancy.

Currently, a DC voltage network is equipped with fuses and isolators, in order to be able to disconnect the fault source from the network in the event of a fault and to be able to maintain the operation of the remaining consumers. In the event of a short circuit, however, it cannot be excluded that electrical components connected to the DC voltage network are damaged. This damage may lead to the failure of the corresponding electrical component. In order to prevent this, rapid switches are sometimes used which are intended to reduce the damaging effect of the short circuit.

The object underlying the invention is to improve a DC voltage network.

SUMMARY OF THE INVENTION

The object is achieved by a DC voltage network with a first DC voltage subnetwork, a second DC voltage subnetwork, an energy storage network, a first power converter, a second power converter and an energy storage device, wherein the first DC voltage subnetwork and the energy storage network are interconnected by means of the first power converter, wherein the second DC voltage subnetwork and the energy storage network are interconnected by means of the second power converter, wherein the energy storage network is connected to the energy storage device in such a way that the energy storage network has the voltage of the energy storage device, wherein the first DC voltage subnetwork and/or the second DC voltage subnetwork are able to be connected to at least one AC voltage network via at least one feed apparatus. The object is further achieved by a method for controlling a DC voltage network of this kind, wherein on the occurrence of a fault in the DC voltage network, at least one of the power converters is switched off as a function of the location of the fault.

Further advantageous embodiments of the invention are specified in the dependent claims.

The invention is based on the knowledge that the fault tolerance of a DC voltage network can be increased by splitting the DC voltage network into two DC voltage subnetworks. The electrical apparatuses, such as consumers and/or sources, are connected to one of the subnetworks. Moreover, the DC voltage network has an energy storage network as a further subnetwork. In the event of a failure of the supplying of energy from a feeding network, the exchanging of energy with the electrical apparatuses can be maintained with the aid of the energy storage device. The energy storage network may be a DC voltage network or an AC voltage network. The use of a DC voltage network is particular suitable for energy storage devices with a DC voltage. This means that said storage devices have a DC voltage at their terminals during operation. Typical representatives of this kind of energy storage are batteries and capacitors (for example double layer capacitors such as Ultracaps).

These at least three subnetworks are interconnected with the aid of power controllers. DC/DC voltage converters, in particular bidirectional DC/DC voltage converters, also referred to as DCP, or current converters may be used as power controllers. Current converters transfer energy between a DC voltage side and an AC voltage side. For application in a DC voltage network, bidirectional current converters are of particular interest, as they enable an energy flow in both directions, i.e. from the AC voltage side to the DC voltage side and from the DC voltage side to the AC voltage side. These power controllers are arranged between the subnetworks and enable the controlled exchange of energy between the subnetworks. By way of the power controllers, it is possible to connect energy storage devices directly to the energy storage network. The setting of the voltage, in particular for power regulation, then takes place via the power controllers connected to the energy storage network. Thus, batteries and/or Ultracaps can be charged or discharged in a DC energy storage network or rotating storage devices can be charged or discharged in an AC energy storage network.

By splitting the DC voltage network into at least two DC voltage subnetworks, it is possible to have control over complex arrangements of consumers and/or sources in relation to the power flow. The use of DC voltage as a DC bus in a DC voltage network allows wide-reaching branch points and feed points, as the segmentation concept is able to be extended almost as desired by means of power controllers. Thus, the AC bus, i.e. a supplying of the individual electrical apparatuses with AC voltage, becomes superfluous and sources, loads and energy storage devices can be installed as desired. The redundancy increases with the number of subnetworks.

In all subnetworks, the voltage can be controlled or regulated as desired by means of the power controllers. In the energy storage network, the voltage is regulated according to the operating mode of the energy storage device connected there. The power controllers thus have a plurality of functions. On the one hand, this is the secure disconnection of the individual subnetworks in the event of a fault, for example. Moreover, the power controllers regulate or control the exchange of power between the subnetworks. Furthermore, the voltage at the energy storage network is set such that the energy storage device is charged or discharged as required. This system creates a considerable improvement in the reliability with the use of only a few components, as it is possible to dispense with a battery charging device for example.

In the event of a short circuit in one subnetwork, the two other subnetworks can continue to be operated. This means that the battery backup is retained. Particularly in the usage case of a ship's propulsion system, this is of great importance and is checked on acceptance of the ship. When using switches instead of power controllers, the failure of a switch causes the installation to no longer be able to be operated safely. In the event of a failure of a power controller, at least one DC voltage subnetwork is still able to supply the connected consumers. Thus, in a ship for example, half of the drive power can still be produced.

The DC voltage network is particularly advantageous if it represents a stand-alone network. This is the case, for example, on ships or in vehicles, in particular in rail vehicles. The loading by large consumers, in particular the switching on and off of large consumers, may be reduced by the provision of energy from the energy storage device. Impacts on other components, due to a drop in the DC voltage or a short-term overvoltage for example, may be avoided by the high dynamic response of the power controller in their entirety, at least for the most part.

By splitting the DC voltage network into at least two DC voltage subnetworks, it is made possible that in the event of faults, e.g. a short circuit in one subnetwork, no components are damaged in the other subnetwork or the other subnetworks. By way of the power controllers, it is moreover possible for the voltage to be regulated or controlled autonomously in any subnetwork independently of the voltage of the remaining subnetworks. This enables a charging or discharging of a directly connected battery. It is possible to dispense with the use of additional battery charging devices, which only have a very limited dynamic response. This saves costs and leads to a high dynamic response in the regulation and the response to fault scenarios. Even in the event of a failure of one power controller, one subnetwork can always still continue to be operated. This is particularly advantageous in ship applications or in rail vehicles, because one DC voltage subnetwork and thus one drive still remains ready for operation, so that the vehicle is able to be controlled. In the application on a ship, the maneuverability is thus ensured.

In an advantageous embodiment of the invention, the first power converter and the second power converter each have a DC voltage converter and the voltage of the energy storage device is a DC voltage. DC voltage converters are often also referred to as DC/DC converters. Advantageously, this should allow a bidirectional flow of energy. These DC/DC converters are then also referred to as DCP. This can be used to set the DC voltages in the DC voltage network in particularly dynamic manner. Thus, a fault scenario can be responded to in such a rapid manner that no damage is caused to electrical apparatuses. Moreover, energy storage devices with DC voltage, such as batteries or capacitors for example, in particular double layer capacitors such as Ultracaps, can be directly connected to the energy storage network. It is then possible to dispense with additional charging devices, which often have a relatively slow regulating behavior with the other components in the system for uncoupling.

Moreover, it has proved advantageous if the DC voltage converter has a potential isolation, Fault currents can thus be avoided even in the event of a ground fault. Simultaneously, part or even the entirety of the DC voltage network remains operational in the presence of a ground fault.

In a further advantageous embodiment of the invention, the first power converter and the second power converter each have a current converter and the voltage of the energy storage device is an AC voltage. Current converters enable an energy transfer between a DC voltage network and an AC voltage network. The use of bidirectional current converters is particularly advantageous, as using these enables an energy transfer in both directions. Energy storage devices in the energy storage network can thereby be charged or discharged with AC voltage in a regulated or controlled manner. For example, rotating storage devices such as centrifugal mass storage devices are eligible as energy storage devices with an AC voltage connector. It is possible to dispense with an otherwise usual actuator, an inverter, which saves costs. At the same time, it is possible to achieve a particular high regulating dynamic response using the current converter, in order to be able to react to fault scenarios in such a rapid manner to avoid damage to other components of the DC voltage network. Here too, a galvanic isolation of the subnetworks from one another can be achieved in a particularly simple manner by means of a transformer for example. Fault currents can thus be avoided even on the occurrence of a ground fault, Simultaneously, part or even the entirety of the DC voltage network remains operational in the presence of a ground fault.

In a further advantageous embodiment of the invention, the DC voltage network has at least one connection converter, wherein by means of the connection converter the first DC voltage subnetwork and the second DC voltage subnetwork are interconnected, By way of the connection converter, an energy exchange between two DC voltage networks can be achieved directly. A bypass via the energy storage network can be avoided. The energy therefore only has to pass one converter on the way from the first DC voltage subnetwork to the second DC voltage subnetwork. In a simple embodiment, the connection converter is a DC voltage converter. By way of the direct connection of the DC voltage subnetworks, an impact on the energy storage network can be avoided. This means that fewer voltage fluctuations are to be observed in the energy storage network. As a result, the anticipated service life of the energy storage devices connected to the energy storage network increases. Moreover, the first and the second power converters may be dimensioned smaller, as they only need to be designed for the power of the energy storage device. Thus, the costs for the implementation of the DC voltage network can be reduced.

In a further advantageous embodiment of the invention, the connection converter has a third power converter, a fourth power converter and a further energy storage network, wherein the first DC voltage subnetwork and the further energy supply network are interconnected by means of the third power converter, wherein the second DC voltage subnetwork and the further energy supply network are interconnected by means of the fourth power converter, wherein the further energy storage network is connected to a further energy storage device such that the further energy storage network has the voltage of the further energy storage device. By splitting the energy storage devices in the DC voltage network between two energy storage networks, it is possible to charge and discharge different batteries with different charge states. Here, the energy storage devices of the different energy storage networks can be charged and discharged independently of one another. This leads to an increase in the service life of the energy storage devices. Different types of storage, such as batteries and capacitors, likewise can be combined. The energy storage network can thus be connected to batteries for example, which emit and receive their energy on a long-term basis. Capacitors are then linked to the further energy storage network, with which electrical energy can be provided in a highly dynamic manner.

In a further advantageous embodiment of the invention, the third power converter and the fourth power converter each have a DC voltage converter and the voltage of the further energy storage device is a DC voltage, Advantageously, this should also allow a bidirectional flow of energy. These can be used to set the DC voltages in the DC voltage network in particularly dynamic manner. Thus, a fault scenario can be responded to in such a rapid manner that no damage is caused to electrical apparatuses. Moreover, energy storage devices with DC voltage, such as batteries or capacitors for example, in particular double layer capacitors such as Ultracaps, can be directly connected to the energy storage network. It is then possible to dispense with additional charging devices, which often have a relatively slow regulating behavior with the other components in the system for uncoupling. Moreover, it has proved advantageous if the DC voltage converter has a potential isolation. Fault currents can thus be avoided even in the event of a ground fault. Simultaneously, part or even the entirety of the DC voltage network remains operational in the presence of a ground fault.

In a further advantageous embodiment of the invention, the third power converter and the fourth power converter each have a current converter and the voltage of the further energy storage device is an AC voltage, Here too, the use of bidirectional current converters is particularly advantageous, as using these enables an energy transfer in both directions. Energy storage devices in the further energy storage network can thereby be charged or discharged with AC voltage in a regulated or controlled manner. For example, rotating storage devices such as centrifugal mass storage devices are eligible as energy storage devices with an AC voltage connector. It is possible to dispense with an otherwise usual actuator, an inverter, which saves costs. At the same time, it is possible to achieve a particular high regulating dynamic response using the current converter, in order to be able to react to fault scenarios in such a rapid manner. It is thus possible to avoid damage to other components of the DC voltage network. Here too, a galvanic isolation of the subnetworks can be achieved in a particularly simple manner by means of a transformer for example. Fault currents can thus be avoided even in the event of a ground fault. Simultaneously, part or even the entirety of the DC voltage network remains operational in the presence of a ground fault.

In a further advantageous embodiment of the invention, a switch is arranged between the connection converter and the first DC voltage subnetwork, wherein a further switch connects a point, situated on the connection between connection converter and the switch, to the energy storage network. It is thus possible for the redundancy in the system to be increased. Even in the event of a failure of a power controller, the ability of the DC voltage subnetworks to be controlled and/or regulated can be ensured even with the failure of a power controller.

In a further advantageous embodiment of the invention, the first DC voltage network has a first line, which is arranged between the first power converter and the connection converter, wherein the first line has a first switch, wherein the second DC voltage network has a second line, which is arranged between the second power converter and the connection converter, wherein the second line has a second switch. The DC voltage network thus receives a ring topology. In this context, the DC voltage subnetworks are each formed via a line which is connected at its ends to the power controllers. On the occurrence of a fault, it is then not approximately half of the DC voltage network which fails, but rather only around a quarter. In the event of a fault in the first DC voltage subnetwork, the first switch makes it possible to only switch off a part of the first DC voltage subnetwork in which the fault is present. The fault location can then be isolated by one of the power converters and one of the switches. The remaining components of the DC voltage network remain operational. For switching off the switches, no high-current switch-off capacity is required. It is sufficient to use switches which are only able to disconnect from the current, as the switching off of the current is already possible by two power converters. Once the corresponding switch has been opened, part of the DC voltage subnetwork is able to be operated again. As the switches only need to have a low switch-off capacity, it is possible to use an isolator instead of a contactor.

Due to the structure of a ring topology of this kind, an even better redundancy property of the DC voltage network is achieved.

BRIEF DESCRIPTION OF THE DRAWING

The invention is described and explained in more detail below on the basis of the exemplary embodiments shown in the figures, in which.

DETAILED DESCRIPTION OF PREFERRED EMBODIMENTS

Figure 1:
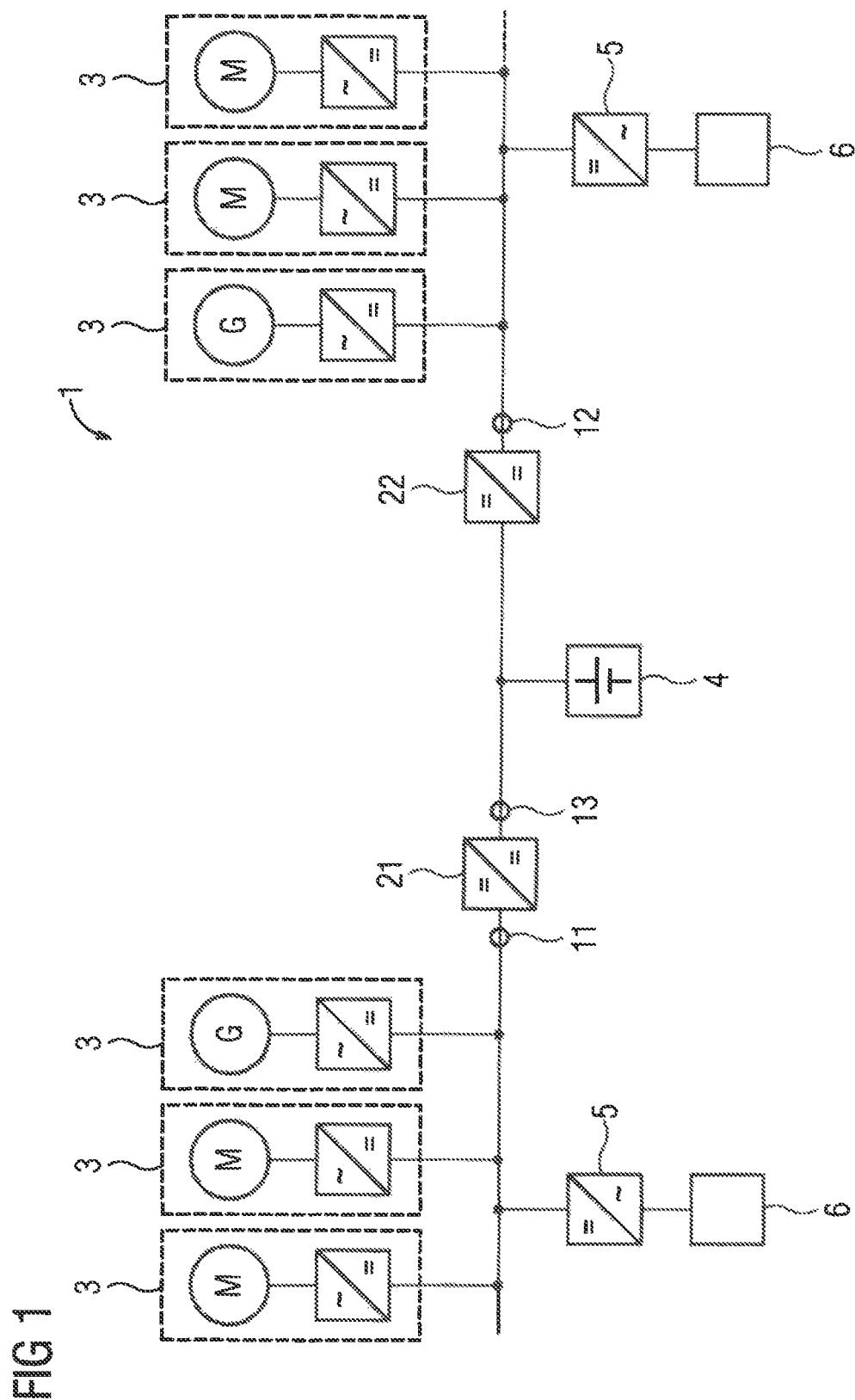
FIG. 1 to FIG. 6 show exemplary embodiments of a DC voltage network.

FIG. 1 shows a DC voltage network 1 with two DC voltage subnetworks 11, 12 as well as an energy storage network 13. These subnetworks are interconnected with power converters 21, 22 in such a way that an energy exchange between said subnetworks 11, 12, 13 is possible by means of the power converters 21, 22. Simultaneously, the power converters 21, 22 make it possible to isolate the subnetworks from one another rapidly. Linked to the DC voltage subnetworks 11,12 are electrical apparatuses 3, which represent electrical consumers or sources. Electrical energy is obtained by these electrical apparatuses 3 from an AC voltage network 6, which is connected to the DC voltage subnetwork 11, 12 via one or more feed apparatuses 5, As an alternative or in addition, it is also possible for electrical energy to be provided or stored from an energy storage device 4, which is directly connected to the energy storage network 13. The regulation or control of the flow of energy to the energy storage device 4 takes place with the aid of the power controllers 21, 22.

With the aid of the power controllers 21, 22, the flow of energy can be interrupted rapidly, in order to isolate faulty components from the overall system for example. It is thus possible to not only ensure operation of the remaining electrical apparatuses 3, but also to reliably avoid damage to said electrical apparatuses 3, for example caused by overcurrent or overvoltage, by way of a rapid response to the power converters 21, 22.

Figure 2:
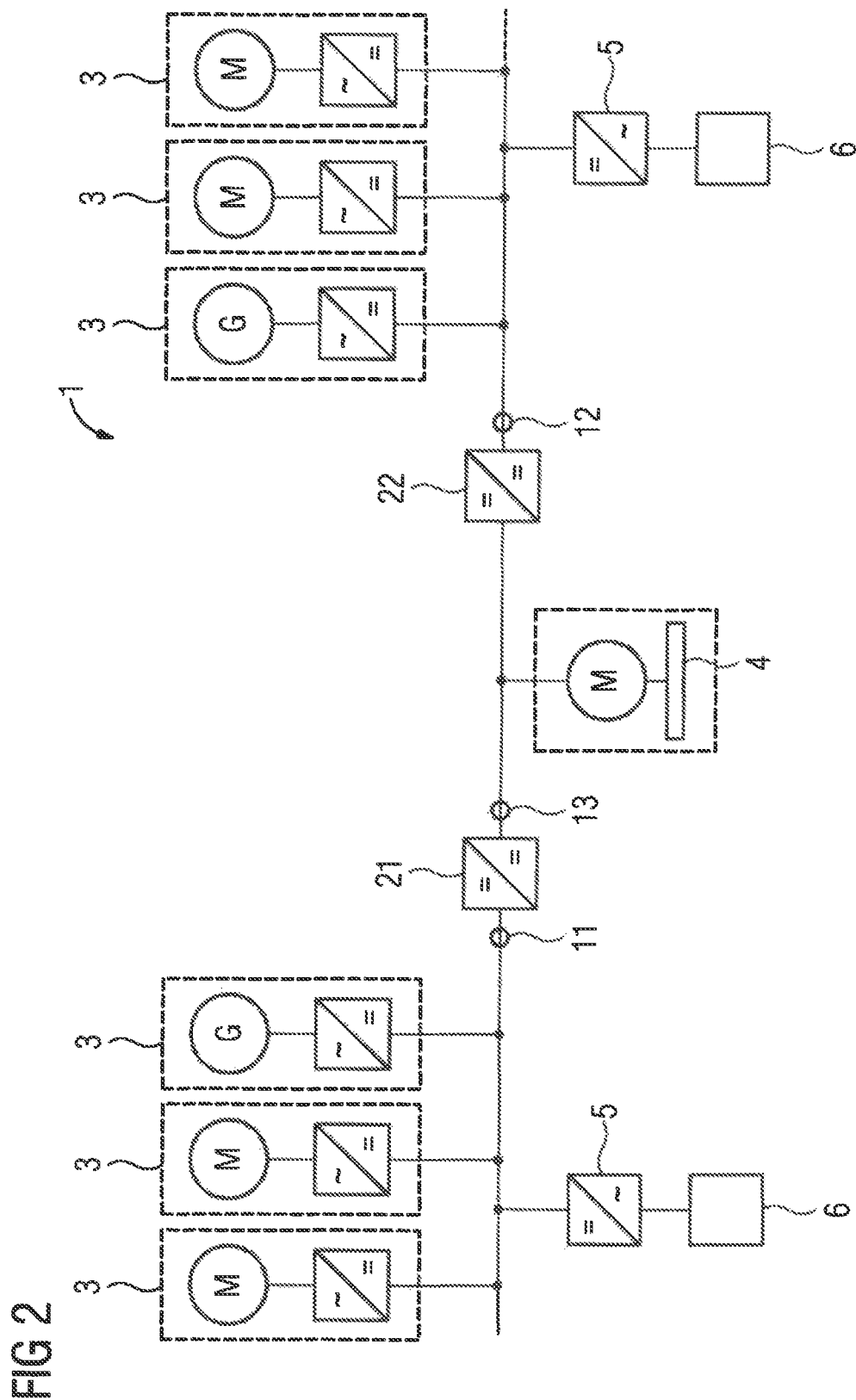

The energy storage device 4 shown here is a battery. Alternatively, a capacitor, in particular a double layer capacitor, may also be used here. What is common among these energy storage devices is that they have a DC voltage during operation. Therefore, DC voltage converters, also referred to as DC/DC converters, are employed as power controllers 21, 22 in this exemplary embodiment, FIG. 2 shows a centrifugal mass storage device as energy storage device 4. As opposed to the energy storage device 4 in FIG. 1, this energy storage device 4 has an AC voltage during operation, when this is linked directly, i.e. without an actuator such as an inverter for example, to the energy storage network 13, In order to control or regulate the energy exchange with the energy storage device 4, current converters are employed as power controllers 21, 22, to which an AC voltage subnetwork and a DC voltage subnetwork are able to be connected. For the avoidance of repetition in relation to corresponding constituent parts, reference is made to the description relating to FIG. 1 and the reference characters therein.

Figure 3:
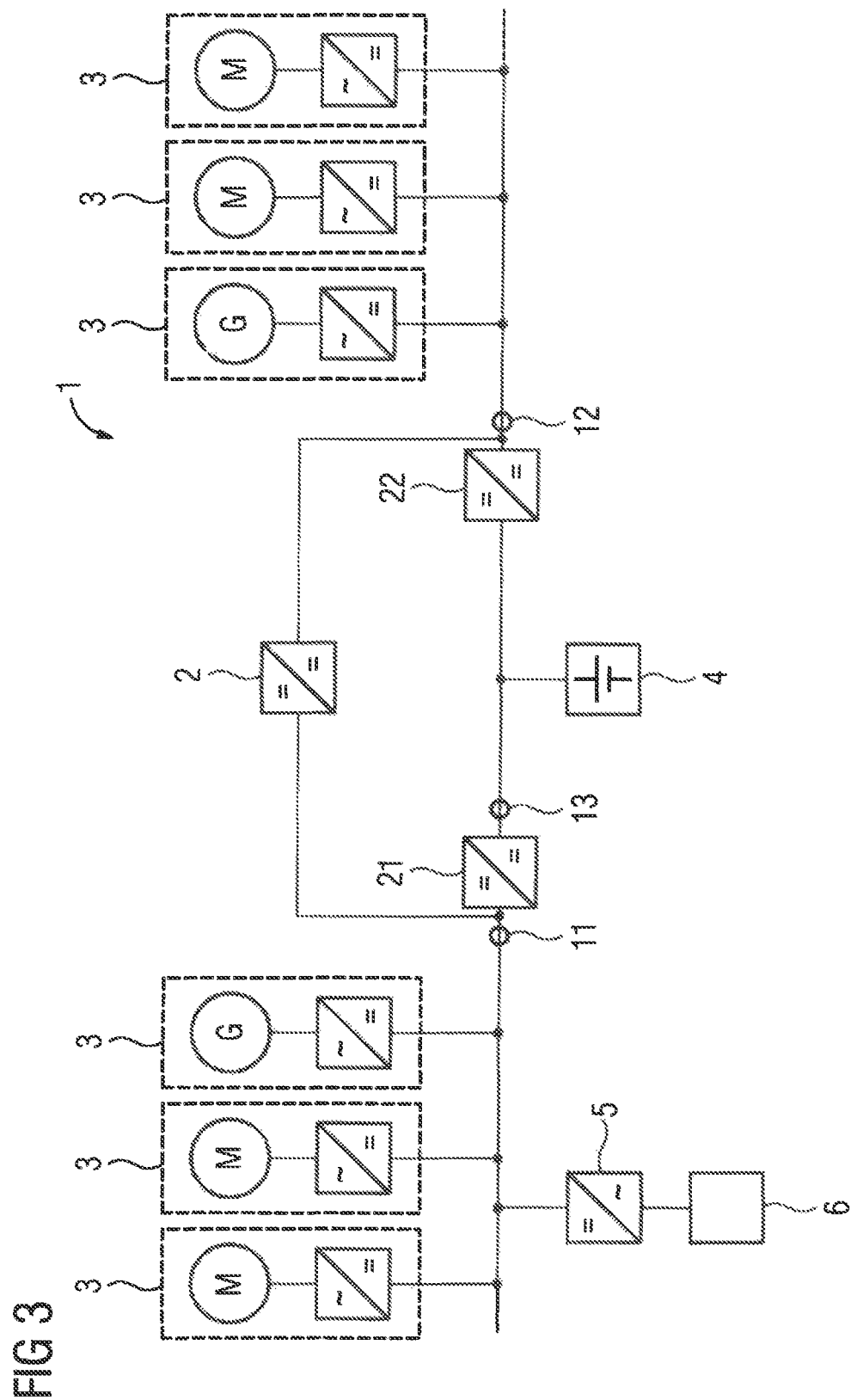

In FIG. 3, the DC voltage network 1 is expanded by a connection converter 2, which interconnects the two DC voltage subnetworks 11, 12 directly. Thus, the corresponding power converters 21, 22 for connection to the energy storage network 13 can be designed smaller, such that only the energy requirement to or from the energy storage device is taken into consideration. The energy exchange between the DC voltage subnetworks is controlled or regulated with the aid of the connection converter 2, It is also possible in this exemplary embodiment to use a centrifugal mass storage device instead of the battery. In this case, current converters according to FIG. 2 are then employed again as power controllers 21, 22 instead of DC/DC converters. By way of the powerful connection converter 2, which is designed for the supply of the second DC voltage subnetwork 12, it is possible to dispense with the feed apparatus 5 for connection to the AC voltage network 6 in the second DC voltage subnetwork 12. For the avoidance of repetition in relation to corresponding constituent parts, reference is made to the description relating to FIGS. 1 and 2 and the reference characters therein.

Figure 4:
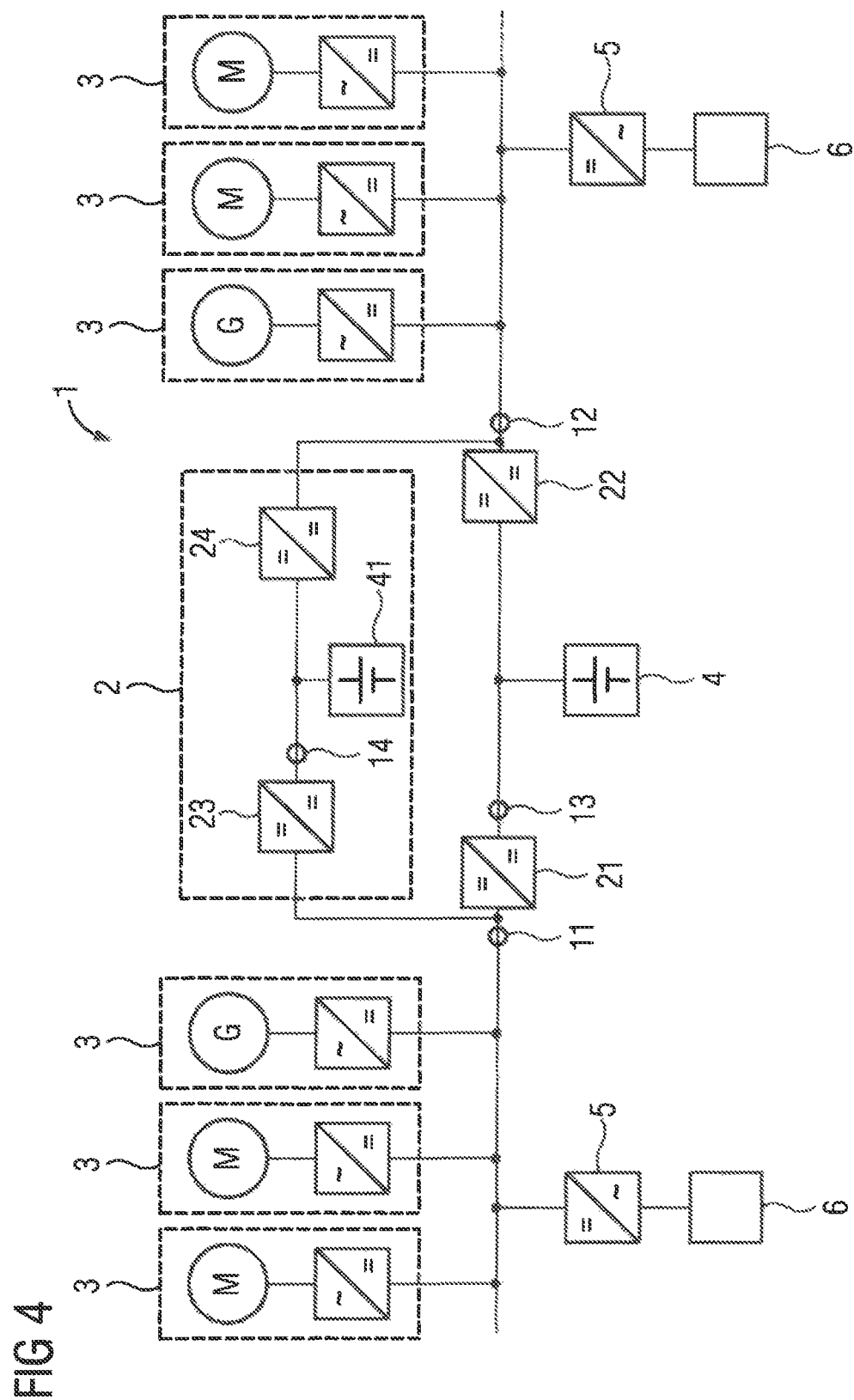

One option for integrating a plurality of energy storage devices 4, 41, in particular a plurality of different energy storage devices 4, 41, into the DC voltage network 1 is shown in FIG. 4. In this figure, the connection converter 2 is expanded by a further energy storage network 14. For exchanging energy with the further energy storage network 14, the connection converter 2 has a third power controller 23 and a fourth power controller 24. Using these, a further energy storage device 41 can be accommodated in the DC voltage network 1. Depending on the type of the energy storage device 4, 41, DC/DC converters or current converters are employed as power controllers 21, 22, 23 as already explained above. For the avoidance of repetition in relation to corresponding constituent parts, reference is made to the description relating to FIGS. 1 to 3 and the reference characters therein. Due to the comparatively high number of power controllers 21, 22, 23, 24, in this exemplary embodiment it is also possible to dispense with one of the shown feed apparatuses according to FIG. 3.

Figure 5:
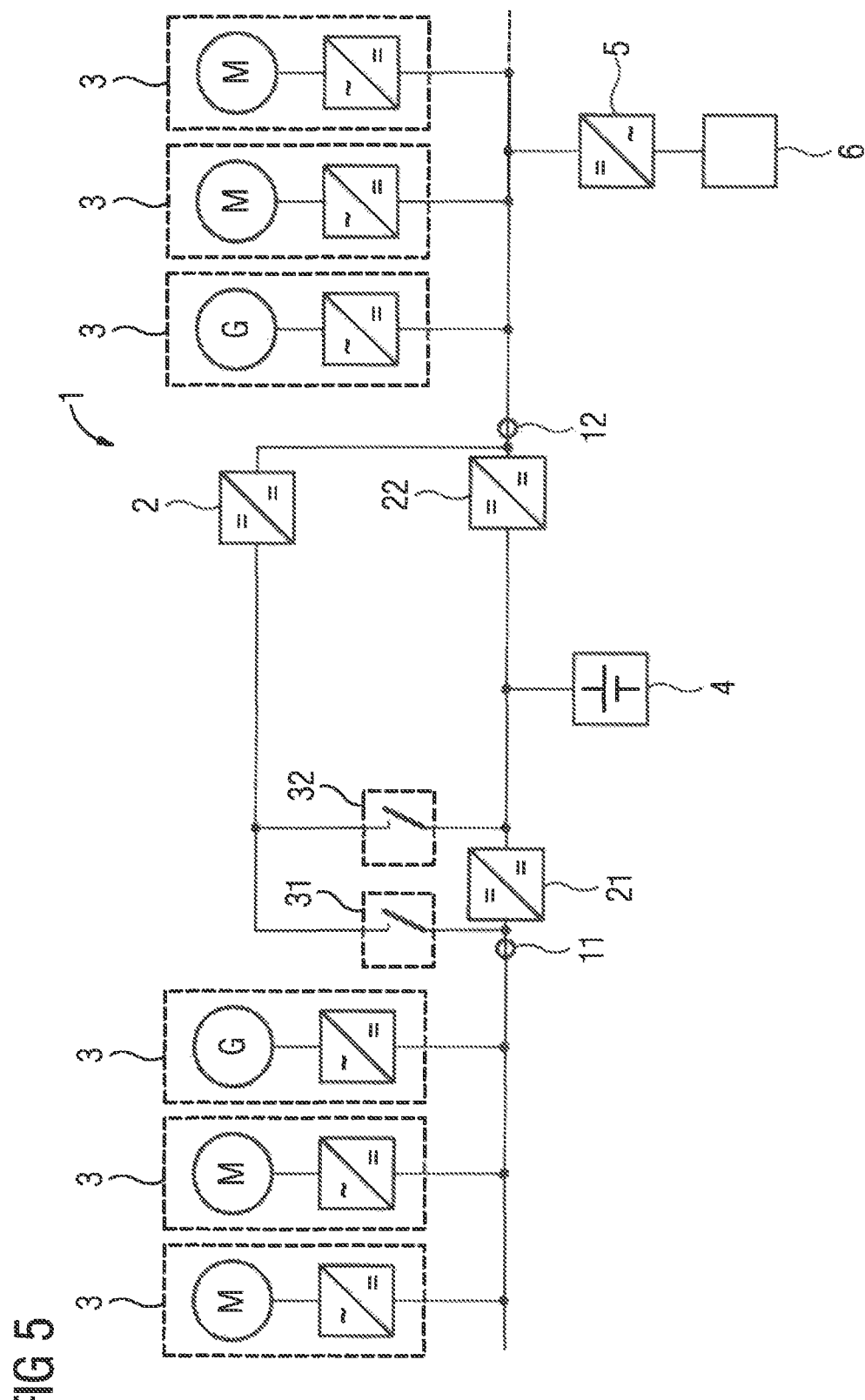

FIG. 5 shows an exemplary embodiment, which has been expanded by a switch 31 and a further switch 32. With this connection converter 2, depending on the switch position of the switches 31, 32, it is possible to either regulate or control an energy transfer between the DC voltage subnetworks 11, 12 or to charge or discharge the energy storage device 4. Thus, without adding further actuators from the field of power electronics, the redundancy of the DC voltage network 1 is increased, as the operation of the DC voltage subnetwork 1 is still possible even in the event of a failure of a power controller 21, 22, As a result of this redundancy, it is possible to dispense with the use of a second feed apparatus 5 for connecting to an AC voltage network 6, without having a significant negative influence on the availability of the DC voltage network 1. For the avoidance of repetition in relation to corresponding constituent parts, reference is made to the description relating to FIGS. 1 to 4 and the reference characters therein.

Figure 6:
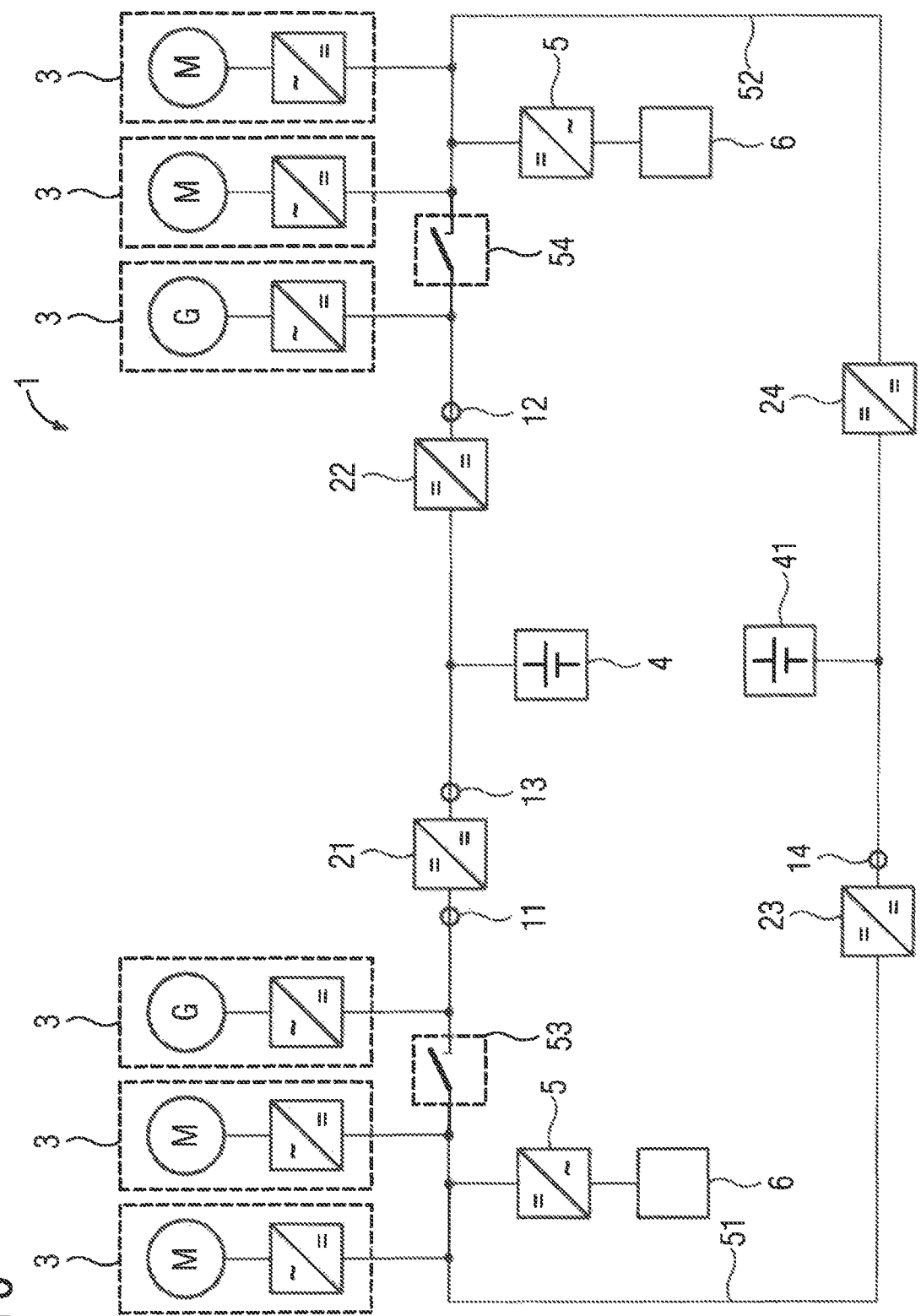

FIG. 6 shows a ring-shaped structure of the DC voltage network 1. In this context, the DC voltage subnetworks 11, 12 are each formed by a line 51, 52. The connection of the lines 51, 52 to power controllers 21, 22, 23, 24 takes place at the opposite ends of the lines 51, 52 in each case. Here, the lines 51, 52 may be embodied as cables or as a conductor bar. In the event of a fault in the first DC voltage subnetwork 11, the first switch 51 makes it possible to only switch off a part of the first DC voltage subnetwork 11 in which the fault is present. Thus, more electrical apparatuses 3 can remain in operation than was the case in the exemplary embodiments shown previously. In the event of a fault, the switch 53 and, depending on the location of the fault, the first or third power controller 21, 23 are then to be switched off, in order to avoid negative impacts of the fault on the remaining electrical apparatuses 3 of the DC voltage network 1, The same applies for the second line 52 of the second DC voltage subnetwork 12 and the second switch 54 there, as well as the second and fourth power controllers 22, 24.

In this context, the first and the second switch 53, 54 may be embodied as contactors, which make it possible to carry out a switching operation even while a current flow is present, and to pass into the opened state. Alternatively, it is possible to reduce the current in the switch 53, 54 to zero by means of the power controllers 21, 22, 23, 24 and then to open the switch 53, 54. Therefore, an isolator can also be used as switch 53, 54 instead of a contactor. For the avoidance of repetition in relation to corresponding constituent parts, reference is made to the description relating to FIGS. 1 to 5 and the reference characters therein.

In summary, the invention relates to a DC voltage network with a first DC voltage subnetwork, a second DC voltage subnetwork, an energy storage network, a first power converter, a second power converter and an energy storage device. In order to improve the DC voltage network, it is proposed that the first DC voltage subnetwork and the energy storage network are interconnected by means of the first power converter, wherein the second DC voltage subnetwork and the energy storage network are interconnected by means of the second power converter, wherein the energy storage network is connected to the energy storage device in such a way that the energy storage network has the voltage of the energy storage device, wherein the first DC voltage subnetwork and/or the second DC voltage subnetwork are able to be connected to at least one AC voltage network via at least one feed apparatus. The invention further relates to a method for controlling a DC voltage network of this kind, wherein on the occurrence of a fault in the DC voltage network, at least one of the power converters is switched off as a function of the location of the fault.

The invention claimed is:
1. A DC voltage network, comprising:
a first DC voltage subnetwork;
a second DC voltage subnetwork;
an energy storage network;
a first power converter interconnecting the first DC voltage subnetwork and the energy storage network;

a second power converter interconnecting the second DC voltage subnetwork and the energy storage network;

an energy storage device connected to the energy storage network in such a way that the energy storage network has a voltage of the energy storage device;

a feed apparatus configured to connect at least one of the first DC voltage subnetwork and the second DC voltage subnetwork to an AC voltage network; and a connection converter configured to interconnect the first DC voltage subnetwork and the second DC voltage subnetwork.

2. The DC voltage network of claim 1, wherein the first power converter and the second power converter each have a DC voltage converter, with the voltage of the energy storage device being a DC voltage.

3. The DC voltage network of claim 1, wherein the first power converter and the second power converter each have a current converter, with the voltage of the energy storage device being an AC voltage.

4. The DC voltage network of claim 1, wherein the connection converter includes a further energy storage network, a third power converter configured to interconnect the first DC voltage subnetwork and the further energy supply network, and a fourth power converter configured to interconnect the second DC voltage subnetwork and the further energy supply network, and further comprising a further energy storage device, the further energy storage network being connected to the further energy storage device such that the further energy storage network has a voltage of the further energy storage device.

5. The DC voltage network of claim 4, wherein the third power converter and the fourth power converter each have a DC voltage converter, with the voltage of the further energy storage device being a DC voltage.

6. The DC voltage network of claim 4, wherein the third power converter and the fourth power converter each have a current converter, with the voltage of the further energy storage device being, an AC voltage.

7. The DC voltage network of claim 1, further comprising:
a first switch arranged between the connection converter and the first DC voltage subnetwork; and
a second switch connecting a point, situated on a connection between the connection converter and the first switch, to the energy storage network.

8. The DC voltage network of claim 1, wherein the first DC voltage subnetwork includes a first line arranged between the first power converter and the connection converter and including a first switch, wherein the second DC voltage network includes a second line arranged between the second power converter and the connection converter and including a second switch.

9. A method for controlling a DC voltage network that includes a first DC voltage subnetwork, a second DC voltage subnetwork, an energy storage network, a first power converter interconnecting the first DC voltage subnetwork and the energy storage network, a second power converter interconnecting the second DC voltage subnetwork and the energy storage network, an energy storage device connected to the energy storage network in such a way that the energy storage network has a voltage of the energy storage device, a feed apparatus configured to connect at least one of the first DC voltage subnetwork and the second DC voltage subnetwork to an AC voltage network, and a connection converter configured to interconnect the first DC voltage subnetwork and the second DC voltage subnetwork, said method comprising switching off at least one of the first and second power converters as a function of a location of a fault in the DC voltage network.

* * * * *